(12) United States Patent
Okada (10) Patent No.: US 7,983,329 B2
(45) Date of Patent: Jul. 19, 2011

(54) COMMUNICATION APPARATUS AND METHOD OF CONTROLLING SAME

(75) Inventor: Hiroki Okada, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 650 days.

(21) Appl. No.: 12/089,649

(22) PCT Filed: Nov. 27, 2006

(86) PCT No.: PCT/IB2006/003485
§ 371 (c)(1),
(2), (4) Date: Apr. 9, 2008

(87) PCT Pub. No.: WO2007/060542
PCT Pub. Date: May 31, 2007

(65) Prior Publication Data
US 2008/0212661 A1 Sep. 4, 2008

(30) Foreign Application Priority Data
Nov. 28, 2005 (JP) ................................ 2005-342092

(51) Int. Cl.
*H04B 1/38* (2006.01)
(52) U.S. Cl. ......... 375/219; 375/316; 375/334; 375/346
(58) Field of Classification Search .................. 375/219, 375/316, 334, 346
See application file for complete search history.

(56) References Cited

U.S. PATENT DOCUMENTS

| 6,836,181 | B2* | 12/2004 | Yoshida ........................ 329/300 |
| 7,369,040 | B2* | 5/2008 | Baumgartner et al. .. 340/426.36 |
| 7,623,604 | B2* | 11/2009 | Loiseau et al. ................ 375/350 |
| 2005/0058232 | A1* | 3/2005 | Murakami et al. ............ 375/350 |
| 2005/0123071 | A1* | 6/2005 | Okada et al. .................. 375/316 |

FOREIGN PATENT DOCUMENTS

| EP | 1 362 753 | 11/2003 |
| FR | 2 859 336 | 3/2005 |
| JP | 8-274756 | 10/1996 |
| JP | 2001-251692 | 9/2001 |
| JP | 2004 64563 | 2/2004 |
| JP | 2005-73163 | 3/2005 |

* cited by examiner

*Primary Examiner* — Leon Flores
(74) *Attorney, Agent, or Firm* — Oblon, Spivak, McClelland, Maier & Neustadt, L.L.P.

(57) ABSTRACT

A communication apparatus including a noise eliminator performing noise reduction processing to cancel a digitized signal received via a receiving antenna, a code decoder, connected to the last stage of the noise eliminator, that decodes the digitized signal that has been subjected to noise reduction processing, a desired-signal detector that limits the noise reduction processing by the noise eliminator when a digitized signal corresponding to a known form of modulation of a desired signal is received by the code decoder, a code interpreter, connected to the last stage of the code decoder, that interprets a decoded signal obtained from decoding by the code decoder, and a controller that disables limitation of the noise reduction processing when a decoded signal not corresponding to a known form of encoding of a desired signal is received by the code interpreter.

12 Claims, 4 Drawing Sheets

| bit(N) | bit(N+1) | BIT RATE |
|--------|----------|----------|
| 0 | 0 | 500Hz |
| 0 | 1 | 1kHz |
| 1 | 0 | 5kHz |
| 1 | 1 | 10kHz |

FIG. 5

COMMUNICATION APPARATUS AND METHOD OF CONTROLLING SAME

BACKGROUND OF THE INVENTION

1. Field of the Invention

The present invention relates to a communication apparatus and to a method of controlling same that have a receiving function that properly eliminates a received signal other than a desired received signal.

2. Description of the Related Art

Japanese Patent Application Publication No. JP-A-2004-64563, for example, describes a digital signal receiving processor characterized as having a receiving antenna, an analog-to-digital (A/D) conversion means that converts an analog signal received by the receiving antenna, and a digital signal processor (DSP) that, based on the uniqueness of a modulation signal responsive to a code to be received by the receiving antenna, separates and outputs a code signal included in the modulation signal from the signal obtained as a digital converted result of the A/D conversion means.

In recent years, various radio communication is being performed in the field and, in accordance with the laws and regulations of various countries, in some countries differing radio communication systems share the same frequency band. For this reason, radio interference of communications is expected to increase.

For this reason, in a configuration such as that described in JP-A-2004-64563, in which an interfering signal and a desired signal are separated based on the uniqueness of a modulation signal, if the form of modulation of the interfering signal resembles that of a desired signal, similarities in the uniqueness of the modulation signals occur, which make it impossible to eliminate an interfering signal.

SUMMARY OF THE INVENTION

The present invention provides a communication apparatus that can properly eliminate an interfering signal even if the form of modulation of the interfering signal resembles that of a desired signal.

A first aspect of the communication apparatus of the present invention has:
  a receiving antenna that receives analog signals;
  an A/D converter that digitizes the received analog signal;
  a noise eliminator, connected to the last stage of the A/D converter, that performs noise reduction processing to cancel an input digital received signal;
  a code decoder, connected to the last stage of the noise eliminator, that decodes the digital received signal that has been subjected to noise reduction processing;
  a desired-signal detector that limits the noise reduction processing by the noise eliminator when a digital received signal corresponding to a known form of modulation of a desired signal is received by the code decoder;
  a code interpreter, connected to the last stage of the code decoder, that interprets a decoded signal obtained from decoding by the code decoder; and
  a controller that disables limitation of the noise reduction processing when a decoded signal not corresponding to a known form of encoding of a desired signal is received by the code interpreter.

If a decoded signal not corresponding to a known form of encoding of a desired signal is received by the code interpreter, the controller may send an instruction to the transmission source of the desired signal to change the form of modulation of the desired signal.

A second aspect of the communication apparatus of the present invention has:
  a receiving antenna that receives analog signals;
  an A/D converter that digitizes the received analog signal;
  a noise eliminator, connected to the last stage of the A/D converter, that performs noise reduction processing to cancel an input digital received signal;
  a code decoder, connected to the last stage of the noise eliminator, that decodes the digital received signal that has been subjected to noise reduction processing;
  a desired-signal detector that limits the noise reduction processing by the noise eliminator when a digital received signal corresponding to a known form of modulation of a desired signal is received by the code decoder;
  a code interpreter, connected to the last stage of the code decoder, that interprets a decoded signal obtained from decoding by the code decoder;
  a transmitter; and
  a controller that causes the transmitter to send an instruction to the side transmitting the desired signal to change the form of modulation of the desired signal when a decoded signal not corresponding to a known form of encoding of a desired signal is received by the code interpreter.

A third aspect of a communication apparatus of the present invention has:
  a receiving antenna that receives analog signals;
  an A/D converter that digitizes the received analog signal;
  a code decoder that decodes the digital received signal;
  a code interpreter, connected to the last stage of the code decoder, that interprets a decoded signal obtained from decoding by the code decoder; and
  a transmitter that transmits, to the transmitting side transmitting the desired signal, an instruction to change the form of modulation of the desired signal when a digitized signal corresponding to a known form of modulation of the desired signal is received by the code decoder and also a decoded signal not corresponding to a known form of encoding of the desired signal is received by the code interpreter.

The known form of modulation corresponding to the desired signal may be detected by a filter or a window configured to detect a signal having a bit rate corresponding to that of the desired signal.

The bit rate detectably the filter or the window may be changed to correspond to the form of modulation of the desired signal after the above-noted instructed change.

The desired-signal detector may, using the filter or the window configured to detect the bit rate corresponding to the desired signal, start limiting the noise reduction processing when the first bit of a bit stream of a signal having the bit rate corresponding to the desired signal is detected.

A fourth aspect of the present invention is a method of controlling a communication apparatus, which comprises the steps of:
  receiving an analog received signal via a receiving antenna;
  digitizing the analog received signal to a digital received signal;
  performing noise reduction processing to cancel the digitized signal;
  decoding the digitized signal that has been subjected to noise reduction processing to generate a decoded code;
  determining whether the decoded code corresponds to a known form of modulation of the desired signal;
  limiting the noise reduction processing if it is determined that the decoded code corresponds to a known form of modulation of the desired signal; and interpreting the decoded code and, when a interpreted decoded code does not correspond to the known form of encoding of the desired signal, enabling the noise reduction processing.

The present invention provides a communication apparatus which can properly eliminate an interfering signal even in the case in which the form of modulation of the interfering signal resembles the form of modulation of the desired signal.

BRIEF DESCRIPTIONS OF THE DRAWINGS

The foregoing and further objects, features, and advantages of the invention will become apparent from the following description of the preferred embodiments with reference to the accompanying drawings, wherein like numerals are used to represent like elements and wherein:

FIG. 3 shows a conceptual view of a filter or window used in a desired-signal detector 118a;

DETAILED DESCRIPTION OF THE PREFERRED EMBODIMENTS

Example embodiments of the present invention are described below, with reference to the accompanying drawings.

Figure 1:
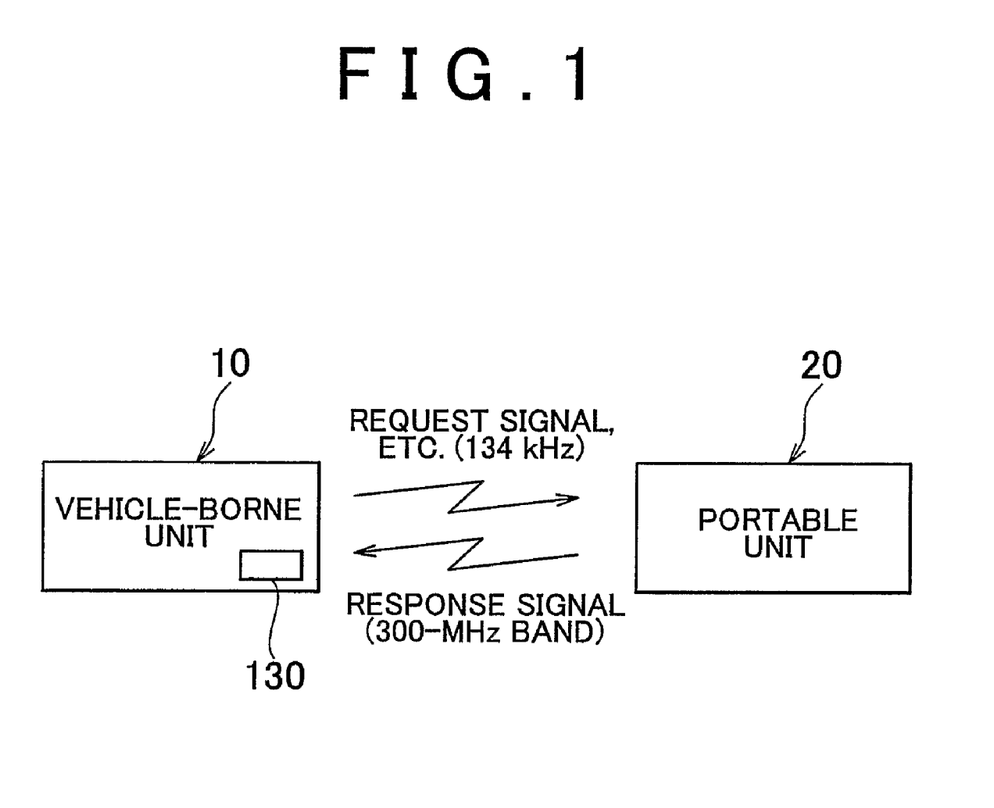
FIG. 1 shows in simplified form an embodiment in which the communication apparatus of the present invention is applied to a communication system.

FIG. 1 shows in simplified form an embodiment in which the communication apparatus according to one embodiment of the present invention is applied to a communication system. The communication apparatus of this embodiment is implemented as a vehicle-borne unit 10 mounted in a vehicle. The vehicle-borne unit 10 is configured to perform bi-directional communication with a portable unit 20 that can be carried by a user. The portable unit 20 has a function that enables remote control of, for example, a door lock. Although in this case the portable unit 20 is typically a handheld key having only a vehicle key function (and may also serve as a mechanical key for the vehicle), it may also be incorporated into a portable unit having a function such as that of a mobile telephone or a portable audio apparatus.

Various communication is performed between the vehicle-borne unit 10 and the portable unit 20.

An example of a typical form of communication, that of communication related to remote control of a vehicle lock, will now be described. In this case, using for example the 134-kHz band, the vehicle-borne unit 10 periodically transmits a request signal toward a prescribed region outside of the vehicle. A portable unit 20 located in the prescribed region receives the request signal. The portable unit 20 responds to the request signal by transmitting a response signal in, for example, the region of the 300-MHz band. The response signal transmitted from the portable unit 20 includes an ID code that is assigned to the portable unit 20. The ID code is incorporated in, for example, the preamble part or the header part of a response signal of a prescribed encoding method (data structure). The response signal is modulated in a prescribed modulation mode and is then transmitted. The modulation mode can be, for example, FSK (frequency shift keying). In this case, the modulation is performed by assigning the code 0 to a first carrier frequency $f_L$ in, for example, the 300-to-400-MHz band, and assigning the code 1 to a second carrier frequency $f_H$, which is higher than $f_L$, in the 300-to-400-MHz band. The modulation mode may alternatively be selected arbitrarily as, for example, BPSK (binary phase-shift keying) or QPSK (quadrature phase-shift keying), binary or multi-level ASK (amplitude shift keying), 16QAM (quadrature amplitude modulation) or 64QAM and the like.

As a result of decoding and interpreting the response signal, if the ID code included in the response signal coincides with preloaded ID code, the controller 130 of the vehicle-borne unit 10 detects the approach to the vehicle of a proper portable unit 20 (user). The controller 130 detects the approach of a proper user to the vehicle and if a prescribed operation indicating the intent of the user to open the door is detected (for example, detection by a touch sensor disposed on an outer door handle), the controller 130 sends a control signal to a door lock actuator that drives a prescribed door lock mechanism to unlock the door. As a result, it is possible for a user holding a proper portable unit 20 to open the desired door and board the vehicle without the necessity of taking out the portable unit 20 and inserting it into the key cylinder or operating a switch on the portable unit 26. Also, the detection of a prescribed operation of intent by the user to perform a door opening operation is not absolutely necessary and, as will be described below, in the case in which interfering radio signals and the like can be reliably eliminated, it is possible to adopt a configuration in which the door lock is released at the point at which there is coincidence between the ID codes. The portable unit 20 can have a user-operable switches set, and may be such that, in response to the switch that is operated various instruction signals (door lock releasing/locking and the like) are transmitted from the vehicle-borne unit 10, in which case, a code (bit stream) representing the various instructions is incorporated into the data part of the response signal, and modulated onto the carrier signal as described above.

The embodiment is not restricted to the object of performing the above-described door lock remote control communication, and may also be applied to communication between the vehicle-bore unit 10 and the portable unit 20 for any purpose.

Figure 2:
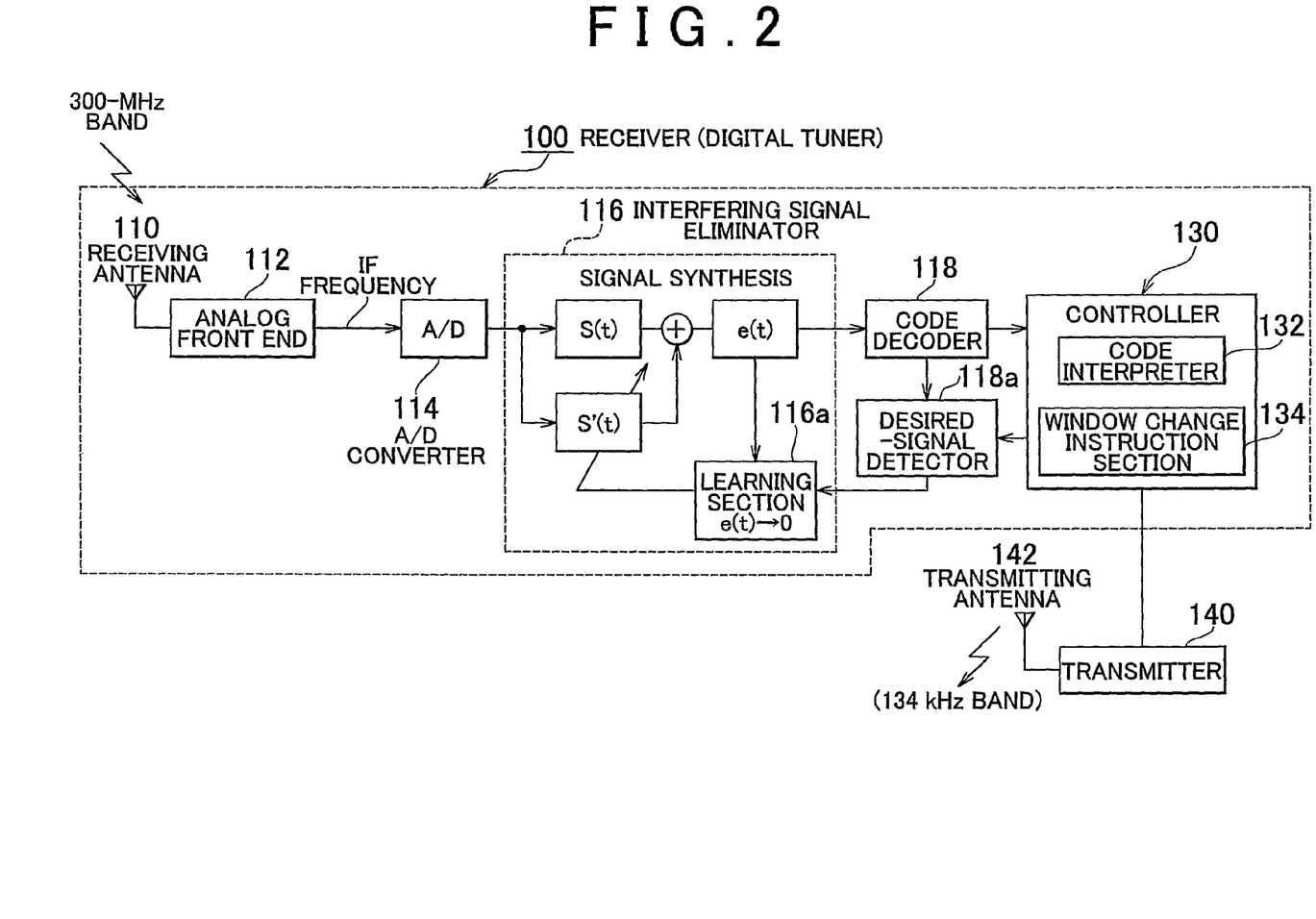
FIG. 2 shows the main elements of the system configuration of a vehicle-borne unit 10.

FIG. 2 shows the main elements of the system configuration of the vehicle-borne unit 10.

As shown in FIG. 2, the receiver 100 (digital tuner) of the vehicle-borne unit 10 receives the response signal (desired signal) transmitted from the portable unit 20 as described above via the receiving antenna 110. The receiving antenna 110 can be mounted, for example, in the region of rearview mirror within the vehicle or in the region of the C-pillar.

An analog front end 112 is connected to the last stage of the receiving antenna 110. At the analog front end 112, the signal received by the receiving antenna 110 passes through a receiving filter, corresponding to the frequency band (for example, the 300-MHz frequency band) of the response signal (desired signal), and after processing, such as amplification, is down-converted to the intermediate frequency of 10.7 MHz. It is also possible to output from the analog front end 112 to the last stage a bandwidth-limited signal in the region of the intermediate frequency via an IF filter (not illustrated).

An A/D converter 114 is connected to the last stage (output side) of the analog front end 112, and an interfering signal eliminator 116 is provided after the last stage of the A/D converter 114. The interfering signal eliminator 116 inputs a received signal s(t) quantized by the A/D converter 114. At the interfering signal eliminator 116, a replica signal s'(t) is synthesized with the received signal s(t), and feedback is performed so that the residual error e(t) between the received signal s(t) and the replica signal s'(t) is substantially zero. More specifically, the interfering signal eliminator 116 has a learning section 116a. The learning section 116a generates the replica signal s'(t) by processing represented, for example, by $s'(t)=-\delta \cdot e^{j\theta} \cdot s(t)$. In this expression, $\delta$ and $\theta$ are, respectively, the amplitude and phase correction coefficients, and these are adapted to minimize the residual error e(t).

In this manner the learning section 116a generates and updates the replica signal s'(t) so that the residual error e(t) that is fed back becomes substantially zero. The learning section 116a successively and continuously updates the replica signal s'(t). In this example, because the learning section 116a is normally in the operating condition, control is performed so that the signal output from the interfering signal eliminator 116 is always substantially zero.

A code decoder 118 is connected to the last stage (output side) of the interfering signal eliminator 116. The code decoder 118 decodes (demodulates) the signal from the interfering signal eliminator 116.

The code decoder 118 is connected with a desired-signal detector 118a. The desired-signal detector 118a uses a filter or a window configured to detect a digitized signal (=d(t)) having a bit rate within a prescribed range, to detect the bit rate of the desired signal. That is, the desired-signal detector 118a, by a filter that adapts to the mode of modulation of the desired signal, determines (detects) whether the desired signal has been received by the code decoder 118. The bit rate is the data transmission speed in units of bps (bits/second). The bit rate is dependent upon the form of modulation, and is related to the modulation period (switching period of the baseband signal) of the modulation signal. For example, when using a binary modulation mode such as FSK modulation for the desired signal, the bit rate coincides with the modulation speed (baud rate), and in the case of multi-level modulation mode (number of phases $M=2^n$), the bit rate is $2^{n-1}$ times the modulation speed (for example, 2 times in the case of 4 phases). Therefore, in the following description there are cases in which the description is related to the units of frequency.

Figure 3:
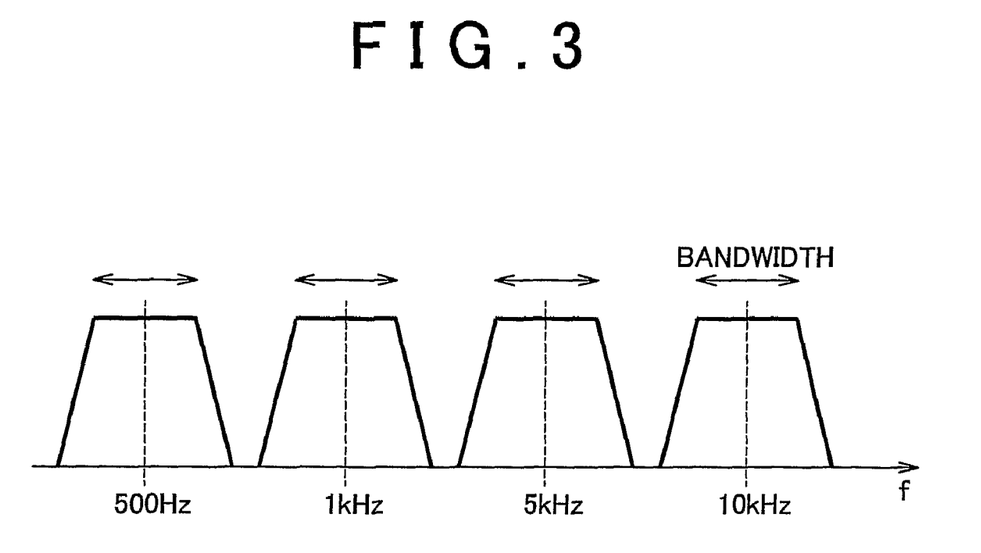

FIG. 3 is a drawing provides a conceptual view of the filter or window (hereinafter "filter") used in the desired-signal detector 118a. As shown in FIG. 3, the filter is configured to detect only a digitized signal having a form of modulation with a prescribed bandwidth having, for example, 1 kHz as the center frequency. In this embodiment, the filter is substantially rectangular and has sharp filter skirts. The center frequency of the filter detection bandwidth is established to correspond to the form of modulation (modulation mode and modulation speed) of the desired signal. That is, because the form of modulation of the desired signal is known, the filter is configured to adapt to this form of modulation. In this embodiment, the center frequency of the filter detection bandwidth is set to correspond to the bit rate of the desired signal. As shown in FIG. 3, the filter can be made switchable, to accommodate a plurality of different bit rates. The filters shown in FIG. 3 are bandpass filters, and can be configured by digital filters.

The desired signal is input from the receiving antenna 110, and when the desired-signal detector 118a detects the bit rate corresponding to the desired signal, the desired-signal detector 118a causes the learning operation of the learning section 116a of the interfering signal eliminator 116 to stop. That is, the updating of the replica signal s'(t) at the interfering signal eliminator 116 is stopped. By doing this, the canceling of the desired signal by the above-described feedback control of the interfering signal eliminator 116 is prevented. When this is done, the desired-signal detector 118a causes the learning operation of the learning section 116a to stop immediately when the first bit of the digitized signal having a bit rate corresponding to the desired signal is detected. By doing this, it is possible to cause the learning operation of the learning section 116a, which would otherwise attempt to cancel the desired signal, to stop immediately.

When the learning operation of the learning section 116a of the interfering signal eliminator 116 is stopped, the updating of the replica signal s'(t)-stops. For this reason, the replica signal s'(t) is held in the condition it had at the point immediately before the learning operation is stopped, this being the condition immediately before reception of the desired signal. The replica signal s'(t), by the learning before the reception of the desired signal, had already been adapted to cancel field noise (broadband noise and the like). When the desired signal is received, therefore, because the replica signal s'(t) removes only the field noise, it is possible to separate only the desired signal from the digitized signal.

In this embodiment, by taking note of the fact that the form of modulation of the desired signal is known, it is possible to use a simple, small-scale noise processing algorithm to separate and extract the desired signal. In particular in the case in which the transmission of a response signal from the portable unit 20 as noted above is done by a weak signal (very small transmitted signal), the desired signal has low strength and is cancelled by field noise or other modulated signals (interfering signals), so that it is easy for a condition to occur in which communication is not possible between the vehicle-borne unit 10 and the portable unit 20. In this embodiment, even in such a situation, because field noise and other interfering signals are canceled in the learning section 116a of the interfering signal eliminator 116, it is possible to extract only the desired signal and effectively prevent signal deterioration and radio interference by field noise and interfering signals.

In recent years, however, various types of radio communication are coming into use in the field, and there could be cases in which similar modulation modes and also substantially the same frequency bands are used by a plurality of communication systems. In this situation, because a signal interfering with the desired signal has a bit rate that is similar to the desired signal, there is a risk that the desired-signal detector 118a mistakenly recognizes it as the "desired signal." In this case, because the learning operation of the learning section 116a of the interfering signal eliminator 116 is stopped, the interfering signal is not eliminated. That is, with only the constitution described above, even if it is possible to eliminate unmodulated field noise and other interfering signals having greatly different bit rates, it is not possible to eliminate an interfering signal having a bit rate that is similar to the desired signal.

Given the above, in this embodiment, a configuration having the features noted below, eliminates not only unmodulated field noise and other interfering signals having greatly different bit rates, but also interfering signals having similar bit rates, making it possible to separate and extract only the desired signal.

Referring again to FIG. 2, a controller 130 is connected to the last stage (output side) of the code decoder 118. The controller 130 has a code interpreter 132 and a window change instruction section 134 as its main constituent elements.

The code interpreter 132 interprets the decoded signal resulting from the decoding by the code decoder 118. The code interpreter 132 has an interpreting key (interpreting rule) corresponding to the response signal (desired signal) sent from the portable unit 20 in a memory, and interprets the information stream (bit stream) of the decoded signal in accordance therewith. For example, the code interpreter 132 interprets the ID code included in the preamble part, and also interprets the bit stream included in the data part that follows the header part that indicates the beginning of data. When this is done, if the ID code is proper, for example, and also a bit stream corresponding to "engage door lock" is included in the data part, the controller 130 instructs the door lock actuator connected via an appropriate bus such as CAN or the like to lock the door.

At this point, when an interfering signal is received that has the same bit rate as, or a similar bit rate to, the desired signal is described below.

If, for example, 1 kHz is used as the default bit rate and an interfering signal having the same or a similar bit rate (for example, 1 kHz or 1.1 kHz) is input, because the bit rate of the interfering signal is the same as, or similar to, (hereinafter "resembles") the desired signal, it is difficult even using a filter to perform separation. For this reason, "mis-detection" by the desired-signal detector 118a occurs, and the learning operation of the learning section 116a of the interfering signal eliminator 116 stops. Therefore, during the period in which the learning operation of the learning section 116a of the interfering signal eliminator 116 is stopped, the interfering signal is passed through to the code decoder 118 and decoded. The interfering signal that is demodulated by the code decoder 118 is supplied to the code interpreter 132.

The encoding method of the interfering signal (for example data structure or frame format) almost always differs from the known encoding system of the desired signal. Therefore, in the case in which a decoded signal differs from the known encoding method of the desired signal appears, the code interpreter 132 judges that an interfering signal having a bit rate resembling the desired signal was received, and immediately cause the learning operation of the learning section 116a of the interfering signal eliminator 116 to restart. By doing this, the learning operation of the learning section 116a of the interfering signal eliminator 116 is restarted immediately, thereby enabling canceling of the interfering signal as quickly as possible.

Thus, according to this embodiment, when an interfering signal resembling the bit rate of the desired signal is received, although the learning operation of the learning section 116a of the interfering signal eliminator 116 is initially stopped, by checking the frame format and the like of the demodulated signal at the code interpreter 132, it is possible to immediately restart the learning operation thereof. Thus, in this embodiment, by applying noise reduction processing by the interfering signal eliminator 116 not only for unmodulated field noise and other interfering signals having a widely different bit rate, but also for an interfering signal resembling the desired signal in bit rate, it is possible to effectively eliminate also an interfering signal having a resembling bit rate.

It is possible to use the fact that the encoding method differs from a known encoding method of the desired signal to discriminate between the desired signal and an interfering signal, it is alternatively possible to use a different known encoding method, such as the code content of the preamble part or the header part to perform the same type of discrimination.

In an environment in which there is continuous reception of an interfering signal having a bit rate resembling that of the desired signal, because the learning section 116a of the interfering signal eliminator 116 continues the learning operation, it is impossible to separate the desired signal during that period of time.

Given the above, when an interfering signal having a bit rate that resembles the desired signal is received, the window change instruction section 134 in this embodiment transmits an instruction, via the transmitter 140, to the transmitting source of the desired signal (that is, the portable unit 20) to change the form of modulation. The window change instruction section 134 sends an instruction to the desired-signal detector 118a to cause the filter to adapt to the form of modulation of the desired signal after the change that is to be made. That is, the filter, as shown in FIG. 3, is changed and switched so that the detection band thereof is such that it is possible to detect the new bit rate after the change that is to be made. For example, when a bit rate corresponding to 1 kHz is used as the default bit rate, if an instruction to change to a bit rate corresponding to 5 kHz is sent to the portable unit 20, the desired-signal detector 118a switches the filter used to a prescribed bandwidth with a center frequency of 5 kHz, as shown in FIG. 3, so that it is possible to detect the digitized signal having a bit rate corresponding to 5 kHz.

Figure 4:
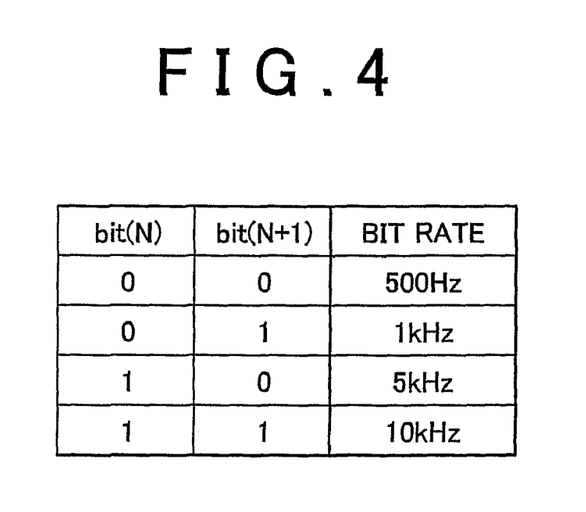
FIG. 4 is a table showing an example of a method of generating an instruction signal.

FIG. 4 is a table showing an example of a method of generating an instruction signal (bit stream). In FIG. 4, there are four bit rates and corresponding instruction signals (bit streams) that correspond to four bit rates (target bit rates of 500 Hz, 1 kHz, 5 kHz, and 10 kHz, respectively) that can be detected by the filter shown in FIG. 3.

In this case, an instruction is issued to select the bit rate that the response signal (desired signal) from the portable unit 20 should have from among the 4 different bit rates. That is, a 2-bit bit stream corresponding to the 4 bit rates (500 Hz, 1 kHz, 5 kHz, and 10 kHz) is incorporated at an appropriate position (for example at the Nth and the (N+1)th bits) in the data part of the instruction signal transmitted from the vehicle-borne unit 10. For example, if a bit rate corresponding to 1 kHz is used as the default bit rate, by checking the frame format and the like of the decoded signal at the code interpreter 132, when an interfering signal is detected that is not the desired signal, a bit stream corresponding to a different bit rate (for example, 5 kHz) than 1 kHz is incorporated into the data part of the instruction signal.

The instruction signal may be sent only in the case in which an interfering signal resembling the bit rate of the desired signal is detected, or in the case in which an interfering signal resembling the bit rate of the desired signal is detected continuously. The instruction signal is transmitted via the transmitting antenna 142 and may, similar to the request signal described above, be transmitted using the 134-kHz band. When this is done, the instruction signal may be transmitted with a transmitted power that is relative high, so that it can be reliably received by the portable unit 20. The transmitting antenna 142 is provided, for example, on the outer door handle, and may be provided at a plurality of locations.

Alternatively, the instruction signal may be transmitted toward the portable unit 20 periodically or every time (every time the approach of the portable unit 20 is detected). In this case, the instruction signal may be incorporated into the data part of the above-described request signal.

Figure 5:
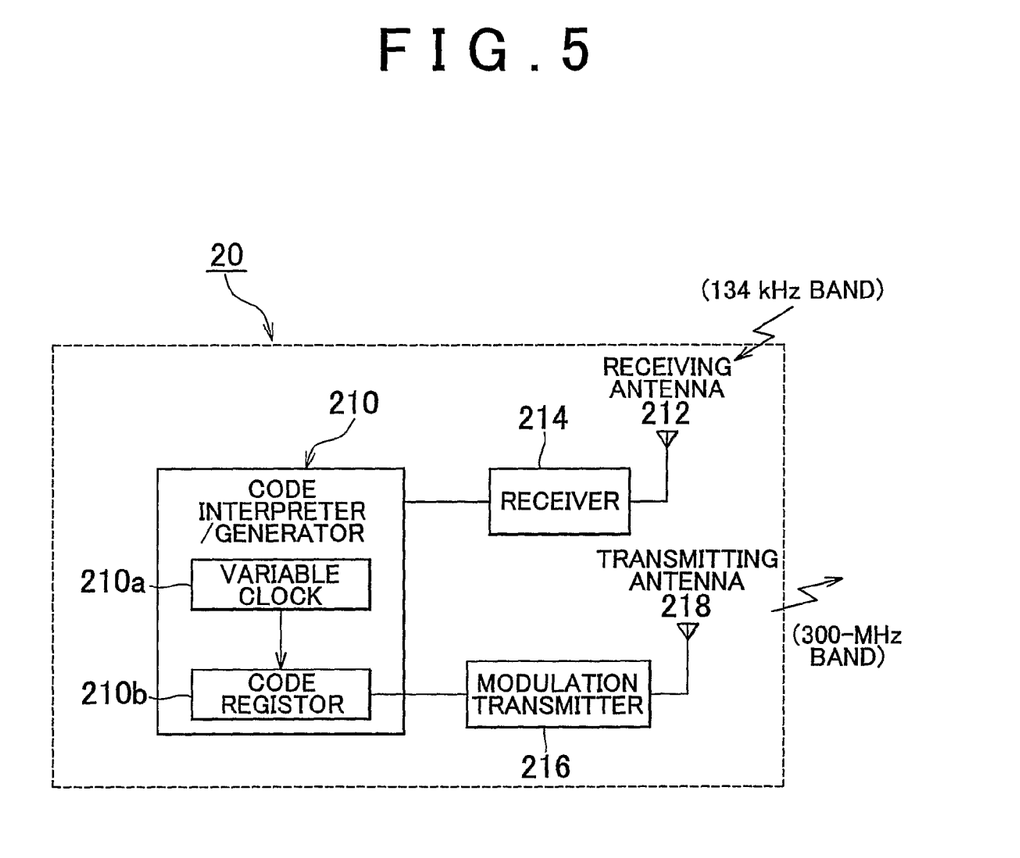
FIG. 5 shows the main system elements of a portable unit 20.

FIG. 5 is a system configuration drawing showing the main elements of a portable unit 20 related to the instruction signal. The portable unit 20 has an antenna 212 and a receiver 214. The instruction signal from the vehicle-borne unit 10, similar to the case of the request signal, is received by the receiver 214 via the antenna 212 and decoded.

The portable unit 20 has a code interpreter/generator 210. The code interpreter/generator 210 has in a memory an interpreting rule of the instruction signal corresponding to the encoding method shown in FIG. 4, and decodes the bit stream of the decoded signal sent from the receiver 214 in accordance therewith. The code interpreter/generator 210 has a variable clock 210a and a code register 210b. The code interpreter/generator 210, in synchronization with a clock signal from the variable clock 210a, uses the code stored in the code register 210b to generate a bit stream of the response signal (desired signal). The code register 210b has a bit stream of the response signal to be generated stored in it, in a form compliant with the prescribed encoding method. This bit stream includes such bit streams as a bit stream that represents the above-noted ID code, and a bit stream that represents the door lock locking and release instructions and the like.

As a result of the interpreting of the instruction signal, in the case, for example, in which the Nth bit and (N+1)th bit of the instruction signal are 1 and 0, respectively, the code interpreter/generator 210 changes the clock frequency of the variable clock 210a so that the response signal is generated at a bit rate corresponding to 5 kHz. For example, in the case of changing the clock frequency to 5 kHz, the code stored in the code register 210b is extracted in synchronization with the 5-kHz clock signal obtained from the variable clock 210a and, as a result, the bit stream (modulation signal) flows at a bit rate of 5 kHz. The modulation transmitter 216 modulates a prescribed carrier signal by the bit stream generated in this manner using a prescribed modulation mode. As a result, the above-described response signal (modulated signal) is transmitted to the vehicle-borne unit 10 via the transmitting antenna 218.

If the portable unit 20 is in the vicinity of the vehicle-borne unit 10, the receiver 100 of the vehicle-borne unit 10 receives the response signal that is transmitted in the manner described above. When this occurs, because the filter in the desired-signal detector 118a has already been switched, it is possible to detect the desired signal with the changed bit rate. By doing this, the learning section 116a of the interfering signal eliminator 116 remains in the stopped condition during the period in which the desired signal is detected, so that it is possible to separate the desired signal without it being eliminated by the interfering signal eliminator 116. In contrast, when an interfering signal resembling the bit rate of the desired signal before the change is received, because the interfering signal resembling the bit rate before the change is no longer detected by the desired-signal detector 118a, the stopped condition of the learning section 116a of the interfering signal eliminator 116 as noted above is released. As a result, the interfering signal eliminator 116 eliminates the interfering signal.

According to the embodiment as described above, by appropriately changing the bit rate of the desired signal, it is possible to prevent an interfering signal having a bit rate resembling the desired signal from being mistakenly detected as the "desired signal." Also, by changing the bit rate of the desired signal, it is possible to prevent interruption of the reception of the desired signal in an environment where an interfering signal with a bit rate resembling the desired signal continues for a relatively long time. Also, when an interfering signal is received that has a bit rate resembling the desired signal after changing the bit rate thereof, although the learning operation of the learning section 116a of the interfering signal eliminator 116 is stopped, because, as noted above, the form of encoding (for example, frame format) of the demodulated signal is checked at the code decoder 132, with the exception of the very rare case in which there is substantial coincidence between the form of encoding of the desired signal and that of the interfering signal, it is possible to immediately restart the learning operation of the interfering signal eliminator 116, and it is possible to eliminate the interfering signal.

While the foregoing has been a detailed description of preferred embodiments of the present invention, it will be understood that the present invention is not restricted to the above-noted embodiments, and can take a variety of forms, variations, and replacements within the spirit and scope of the present invention.

For example, in the above-described embodiment the instruction signal to change the bit rate to the portable unit 20 may be transmitted using a different form of transmitting the request signal. A different form of transmission may be used, because the request signal is a very weak radio signal, and there may be situations where the reception by the portable unit 20 is not possible. Therefore, for example, when the portable unit 20 is a mobile telephone or the like, and it is possible to perform reliable communication between the portable unit 20 and the vehicle-borne unit 10 (including the case of via an external center) using a different frequency band, the instruction signal may be made receivable by the portable unit 20 on the different frequency band.

Also, although in the above-noted embodiment the bit rate of the response signal (desired signal) in the portable unit 20 is changed by changing the clock frequency of the variable clock 210a, the response signal (desired signal) bit rate may alternatively be changed by changing the modulation mode of QAM or the like.

In the above-described embodiments, the various signal processing performed in the receiver 100 may be implemented using a DSP (digital signal processor) or an FPGA (field-programmable gate array). Part of the functionality of the controller 130 can be implemented in cooperation with another controller connected to the controller 130 (for example, a body ECU that controls body-related electronic components, including the door lock actuator).

The invention claimed is:

1. A communication apparatus comprising:
   a receiving antenna that receives analog signals;
   an A/D converter that digitizes the received analog signal;
   a noise eliminator, connected to the last stage of the A/D converter, that performs noise reduction processing to cancel an input digitized signal;
   a code decoder, connected to the last stage of the noise eliminator, that decodes the digitized signal that has been subjected to noise reduction processing;
   a desired-signal detector that limits the noise reduction processing by the noise eliminator when a digitized signal corresponding to a known form of modulation of a desired signal is received by the code decoder;
   a code interpreter, connected to the last stage of the code decoder, that interprets a decoded signal obtained from decoding by the code decoder; and
   a controller that disables limitation of the noise reduction processing when a decoded signal not corresponding to a known form of encoding of a desired signal is received by the code interpreter.

2. The communication apparatus according to claim 1, wherein
   the controller sends an instruction to a transmission source of the desired signal to change the form of modulation of the desired signal when a decoded signal not corresponding to a known form of encoding of the desired signal is received by the code interpreter.

3. The communication apparatus according to claim 2, wherein
   the known form of modulation corresponding to the desired signal is detected by a filter or window configured to detect a signal having a bit rate corresponding to the desired signal, and
   the bit rate detectable by the filter or the window is changed to correspond to the form of modulation of the desired signal after the instructed change.

4. The communication apparatus according to claim 1, wherein
the known form of modulation corresponding to the desired signal is detected by a filter or a window configured to detect a signal having a bit rate corresponding to the desired signal.

5. The communication apparatus according to claim 4, wherein the filter is a digital filter.

6. The communication apparatus according to claim 1, wherein
the desired-signal detector, using a filter or window configured to detect a signal having a bit rate corresponding to the desired signal, starts to limit the noise reduction processing when the first bit of a bit stream of a signal having a bit rate corresponding to the desired signal is detected.

7. The communication apparatus according to claim 1, wherein
a modulation mode of the desired signal received via the receiving antenna is FSK.

8. The communication apparatus according to claim 1, wherein
the communication apparatus is a vehicle-borne unit.

9. The communication apparatus according to claim 1, wherein
the transmission source that transmits the desired signal to the communication apparatus is a handheld key, having a function that enables remote control of a vehicle door lock.

10. A communication apparatus comprising:
a receiving antenna that receives analog signals;
an A/D converter that digitizes the received analog signal;
a noise eliminator, connected to the last stage of the A/D converter, that performs noise reduction processing to cancel an input digitized signal;
a code decoder, connected to the last stage of the noise eliminator, that decodes the digitized signal that has been subjected to noise reduction processing;
a desired-signal detector that limits the noise reduction processing by the noise eliminator when a digitized signal corresponding to a known form of modulation of a desired signal is received by the code decoder;
a code interpreter, connected to the last stage of the code decoder, that interprets a decoded signal obtained from decoding by the code decoder;
a transmitter; and
a controller that causes the transmitter to send an instruction to a transmission source of the desired signal to change the form of modulation of the desired signal when a decoded signal not corresponding to a known form of encoding of a desired signal is received by the code interpreter.

11. A communication apparatus comprising:
a receiving antenna that receives analog signals;
an A/D converter that digitizes the received analog signal;
a code decoder that decodes the digitized signal;
a code interpreter, connected to the last stage of the code decoder, that interprets a decoded signal obtained from decoding by the code decoder; and
a transmitter that transmits, to a transmission source of the desired signal, an instruction to change the form of modulation of the desired signal when a digitized signal corresponding to a known form of modulation of the desired signal is received by the code decoder and also a decoded signal not corresponding to a known form of encoding of the desired signal is received by the code interpreter.

12. A method of controlling a communication apparatus comprising:
digitizing the received analog signal;
performing noise reduction processing to cancel the digitized signal;
decoding the digitized signal that has been subjected to noise reduction processing to generate a decoded code;
determining whether the decoded code corresponds to a known form of modulation of the desired signal;
limiting the noise reduction processing if it is determined that the decoded code corresponds to a known form of modulation of the desired signal; and
interpreting the decoded code and, when a interpreted decoded code does not correspond to the known form of encoding of the desired signal, enabling the noise reduction processing.

* * * * *